(12) United States Patent
Tanaka et al.

(10) Patent No.: US 6,501,865 B1
(45) Date of Patent: Dec. 31, 2002

(54) DYNAMIC THRESHOLDING MODULE WITH IR LED LIGHT SOURCE FOR A CONTACT IMAGE SENSOR

(75) Inventors: Satoru C. Tanaka, San Jose, CA (US);
Hsin Fu Tseng, San Jose, CA (US);
Pheng Tan, San Jose, CA (US)

(73) Assignee: Peripheral Imaging Corporation, San Jose, CA (US)

( * ) Notice: Subject to any disclaimer, the term of this patent is extended or adjusted under 35 U.S.C. 154(b) by 0 days.

(21) Appl. No.: 09/505,393

(22) Filed: Feb. 16, 2000

Related U.S. Application Data

(63) Continuation-in-part of application No. 09/322,374, filed on May 28, 1999, now Pat. No. 6,381,378.

(51) Int. Cl.⁷ ............................. G06K 7/00; H04N 1/40
(52) U.S. Cl. ........................................ 382/312; 358/482
(58) Field of Search ........................... 382/312; 358/474, 358/482, 471; 250/200, 559.06

(56) References Cited

U.S. PATENT DOCUMENTS

| | | | | |
|---|---|---|---|---|
| 5,448,242 A | * | 9/1995 | Sharpe | 342/42 |
| 5,525,994 A | * | 6/1996 | Hurta | 342/51 |
| 5,861,817 A | * | 1/1999 | Palmer | 344/825.35 |
| 5,892,226 A | * | 4/1999 | Robinson | 250/338.3 |
| 6,381,378 B1 | * | 4/2002 | Tanaka | 382/312 |

* cited by examiner

*Primary Examiner*—Jerome Grant, II
(74) *Attorney, Agent, or Firm*—The Kline Law Firm

(57) ABSTRACT

A dynamic threshold two-level A/D converter, also termed a tracking digitizer circuit. The module circuitry includes a comparator circuit and a tracking low-pass filter circuit. The dynamic thresholding module takes the output signals from a CIS module and develops a tracking (variable) background signal. The tracking background signal is then compared to the output signals from the CIS in a comparator. The comparator outputs a two-level (binary) output digital signal. The circuit is designed to be used in conjunction with a scanning device, particularly a CIS system. The circuit can be used in a wide variety of applications that require pre-processed digitized video signals. The dynamic thresholding module's circuitry can be implemented quite simply. Moreover, the circuit provides a very low cost and a low parts density module that can easily be incorporated with existing CIS modules without substantially increasing the size of the CIS module or the cost to manufacture the unit. The circuit requires roughly half the space required by existing digital circuits that accomplish similar ends. An IR LED is used in the CIS module to increase the discrimination ability of the device when scanning material with a colored background.

12 Claims, 7 Drawing Sheets

Module Timing Diagram

DYNAMIC THRESHOLDING MODULE WITH IR LED LIGHT SOURCE FOR A CONTACT IMAGE SENSOR

This application is a continuation-in-part of Applicant's application Ser. No. 09/322,374, filed May 28, 1999, now U.S Pat. No. 6,381,378.

FIELD OF THE INVENTION

The present invention relates generally to scanning devices, and more particularly is a module used in conjunction with a CIS scanner to provide a dynamic threshold level for the scanned image. Infrared light sources are used to improve the discrimination of the device.

BACKGROUND OF THE INVENTION

Current imaging technology has advanced to a state in which scanning devices can be made that are physically quite compact and very inexpensive to manufacture. These systems, although simple in construction and inexpensive to manufacture, produce very accurate results. One of the innovations instrumental in the advancement of scanning technology is the use of full width CIS (Contact Image Sensor) systems. These systems greatly reduce the space requirements for a system, and provide superior reproduction of the images through the use of a linearly abutted hybrid sensor array.

FIG. 1 depicts a full width CIS system. Earlier scanning systems had to make use of an optical reduction system due to limited sensor width. In the full width system, the optical reduction system is replaced with a full-width rod/lens system. This system allows one-to-one scanning of the subject document because the rod lens and the image sensor array are of the same width as (or greater width than) the document to be scanned. This arrangement reduces the distance required between the image sensor and document being scanned to less than 2 cm, thereby allowing the construction of very compact units.

In the full-width CIS system, a light source (the LED bar) generates light that is reflected off the subject document. The reflected light is directed by a full-width rod lens onto a full-width sensor array. The individual sensors in the array are serially activated to detect light levels across an image line.

FIG. 2 is a schematic representation of the operation of the system illustrated in FIG. 1. The system utilizes a plurality of individual sensor chips butted end-to-end on a single substrate. The number of individual sensor chips chosen is dependent upon the desired width and resolutions of scanning. In the system illustrated, 13 individual sensor chips, each with 96 sensing elements, are utilized. This array therefore yields 1,248 pixel elements per scanned line. The CIS system also comprises signal-processing means to serially activate the individual sensor chips and to process the output signals.

The construction and operation of the particular CIS module illustrated is described in further detail in assignee's co-pending applications—Ser. No. 08/928,913, "High-Density and High-Speed CIS Array", filed Sep. 12, 1997, and Ser. No. 09/001,875, "Charge Storage Image Scanner Having Equalizing Pre-Charge and Reset Improvements", filed Dec. 31, 1997. These applications are hereby incorporated by reference in their entirety, and thus the construction and operation of the scanning module are not discussed in further detail herein.

Scanning modules produced with the technology described above are quite efficient and very practical. This is particularly true when the module is being used to scan documents printed only in black and white. The output can then be generated with reference to a single background level (white), and the required storage capacity for the output signal is not too large to handle economically. However, when the documents to be scanned contain multiple colors and shades, the required storage can be prohibitive. When one considers that for an 8½×11 page scanned at 300 dpi there are nearly 8½ million bits of information required, data capacity considerations rapidly become very important.

One application that is particularly sensitive to size considerations is the remote transmission of scanned images. In applications such as this, the data to be transmitted must be compressed.

In addition to transmission applications, many other scanning applications would benefit from the ability to output compressed data. These applications are limited by the need for any add-on circuit to not only be physically small, but also to be inexpensive and to require very few output pins. One such additional application is the scanning of checks in stores. This application requires an inexpensive scanner due to the huge number of units that would be required to implement an automatic scanning system in most retail chains. However, one of the chief problems when scanning documents such as checks is the wide variety of backgrounds that can be encountered. Instead of the black on white color scheme encountered in most documents, checks can have an infinite variety of background colors and patterns.

Discrimination of the scanning device relative to eliminating the color background to read only the black or dark gray account information can be improved by utilizing specialized light. The use of red/green/blue (RGB) light is very convenient. However, a RGB light source is very expensive, and therefore makes a CIS device using a RGB light source impractical for the considered applications. Another light that is useful for the discrimination improvement is a white cold cathode tube. This source requires a high-voltage ballaster, and takes a significant amount of time for the output light to stabilize after the device is turned on. These technical limitations render the white cold cathode tube similarly impractical for the present types of applications.

Accordingly, it is an object of the present invention to provide a circuit that processes analog output from a scanning device, and outputs compressed digital information for a scanned pixel.

It is a further object of the present invention to provide a circuit that requires very little space, and is easy and inexpensive to manufacture.

It is a still further object of the present invention to minimize component pin-out count for a module containing the circuit of the present invention.

It is yet another object of the present invention to provide a scanning device that has exceptional discrimination characteristics for colored and patterned backgrounds with black or dark gray text.

SUMMARY OF THE INVENTION

The present invention is a dynamic threshold two-level A/D converter, or a tracking digitizer circuit. The module circuitry comprises a comparator circuit and a tracking low-pass filter circuit. The dynamic thresholding module takes the output signals from a CIS module and develops a tracking (variable) background signal. The tracking background signal is then compared to the output signals from the CIS in a comparator. The comparator outputs a two-level (binary) output digital signal. The function of the digitizer is illustrated in the schematic block diagram shown in FIG. 8.

The current art digital processing techniques used to achieve results similar to those of the dynamic thresholding module are summarized in FIG. 9. The advances represented by using the analog approach of the present invention versus digital techniques can be seen by comparing FIGS. 8 and 9. Because the signal is to be digitized, the input of the digital circuit requires an anti-alias filter and an A/D converter. In contrast, the analog implementation of the present invention requires neither of these components. Furthermore, the simple RC low-pass filter utilized in the circuitry of the dynamic thresholding module must be replaced by a complicated digital low-pass filter equivalent circuit. It consists of a digital adder and a delay storage memory with weighted feedback coefficients (used for band shaping the filters) that are connected by the feedback bus. The digital output of the low-pass filter is applied to the input bus of one of the digital signal inputs that serves as the reference for the digital comparator. The other input receives the digitized signal from the A/D converter. The two digital signals on both buses are compared and the resulting high or low output from the comparator is produced as a two-level digitized signal on a single output line with a ground return. Hence, the signal process is equivalent to the analog version, but with far more complexity than that of its analog counterpart.

The circuit of the present invention is designed to be used in conjunction with a scanning device, particularly a CIS system. The circuit can be used in a wide variety of applications that require pre-processed digitized video signals.

The dynamic thresholding module's circuitry can be implemented quite simply. Moreover, the circuit provides a very low cost and a low parts density module that can easily be incorporated with existing CIS modules without substantially increasing the size of the CIS module or the cost to manufacture the unit. The circuit requires roughly half the space required by existing digital circuits that accomplish similar ends.

In addition, it has been found during the development of the present invention that use of infrared (IR) light, particularly infrared light at 880 nm, greatly enhances the discrimination of the device. Use of the IR light source allows the device to easily eliminate the color backgrounds on the checks so that the device can quickly and easily read the black or gray account information printed on the checks.

An advantage of the present invention is that it converts the analog output of a CIS scanner into digital form through a simple process.

Another advantage of the present invention is that it can be contained in a module that requires very little space.

A still further advantage of the present invention is that it minimizes component pin-out count.

Yet another advantage of the present invention is the use of IR light to improve discrimination characteristics for checks with colored and patterned backgrounds with black or dark gray text.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

The present invention is a dynamic thresholding module 10 comprising an analog circuit that digitizes the analog video signal from a standard CIS into a two-level (binary) digital output. The circuit comprises a comparator circuit 20 and a tracking low-pass filter circuit 30. The digitization is accomplished by the dynamic thresholding module's processing the output signals from the CIS, and tracking the background levels of the images scanned. The signal established by the digitizer as the average background is then compared to the output signals from the CIS in a comparator. By comparing the output signals from the CIS with the reference signal, the comparator produces the proper two-level digital output signals.

Figure 5:
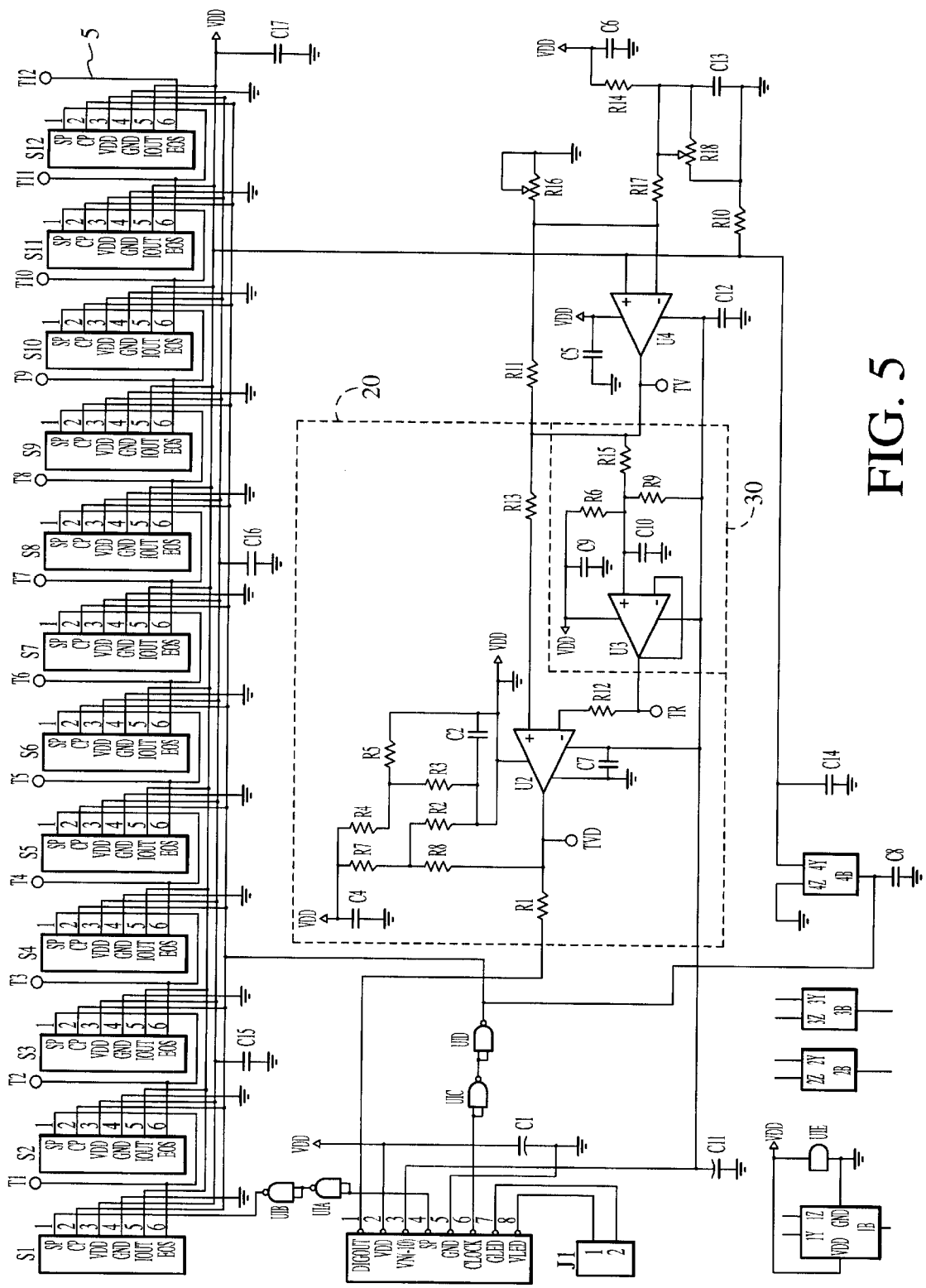
FIG. 5 is a circuit diagram of the present invention installed in a CIS system.
Figure 6:
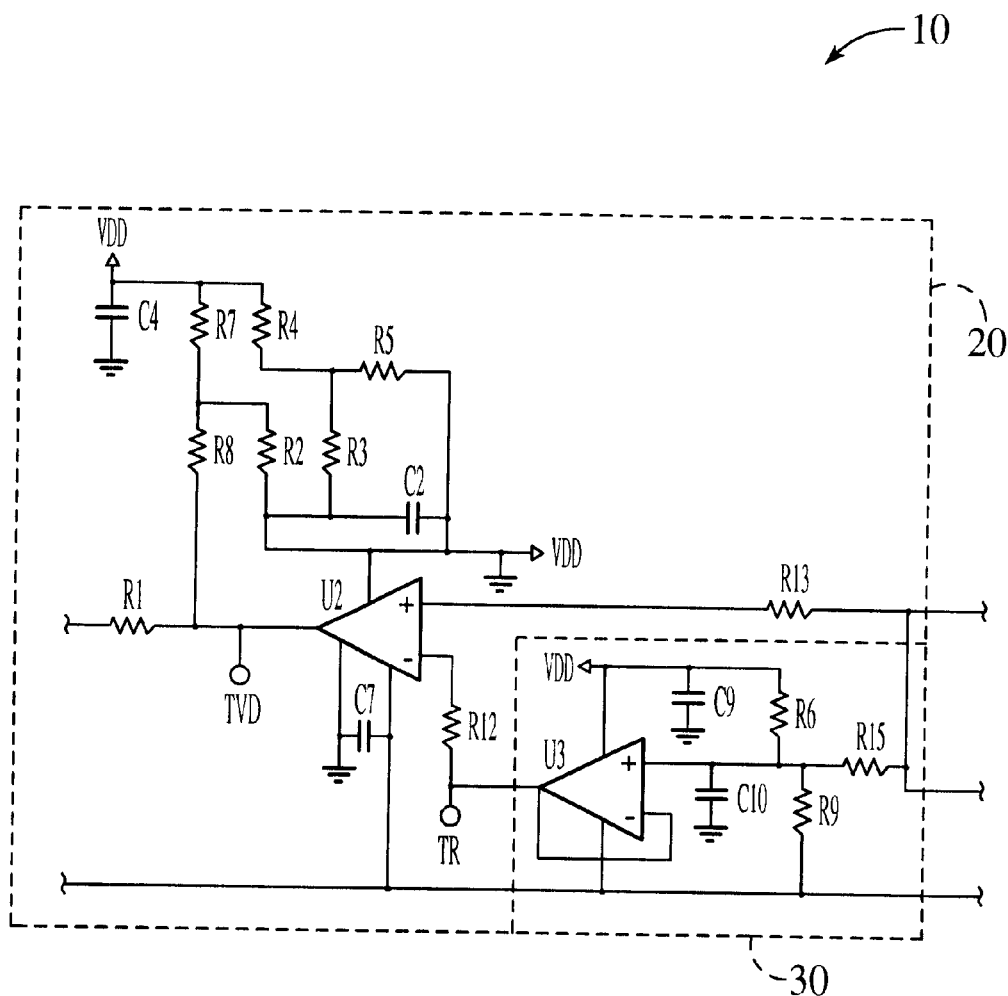
FIG. 6 is a circuit diagram of the dynamic thresholding module of the present invention.
Figure 7:
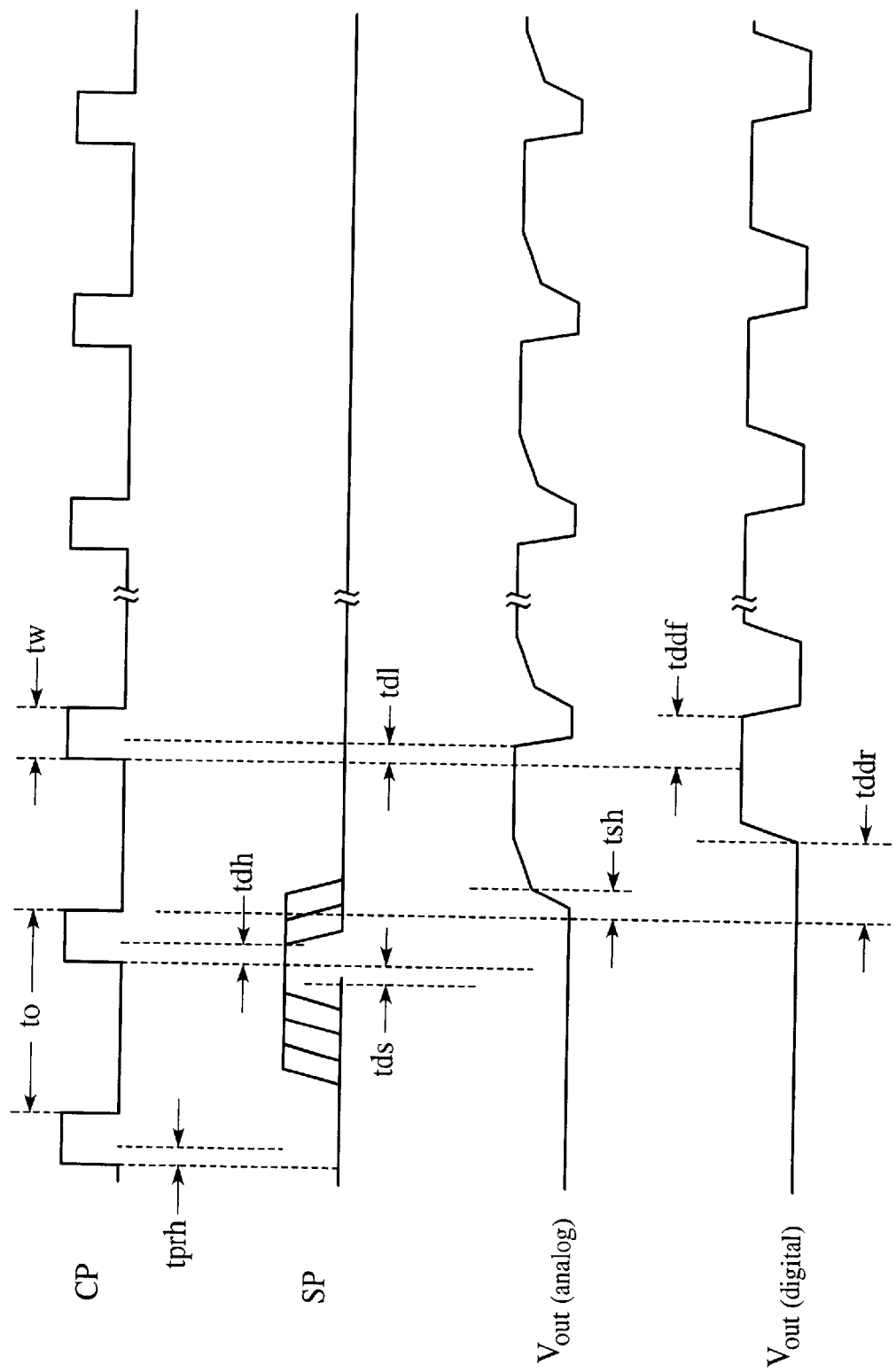
FIG. 7 is a timing diagram for the dynamic thresholding module of the present invention.
Figure 8:
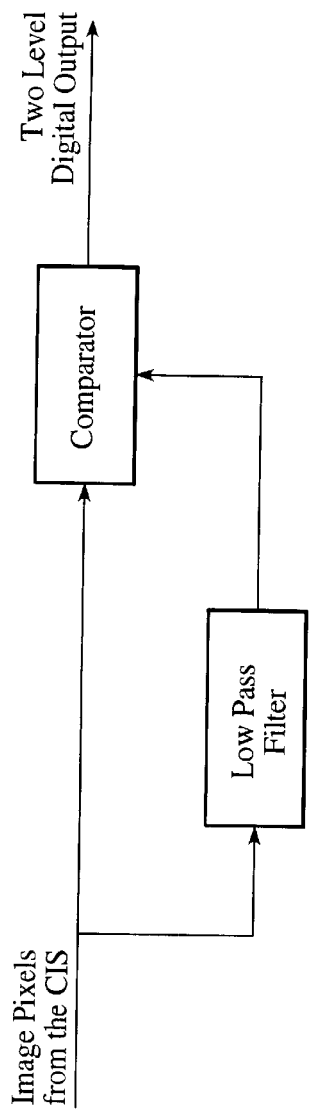
FIG. 8 is a schematic block diagram of the present invention.
Figure 9:
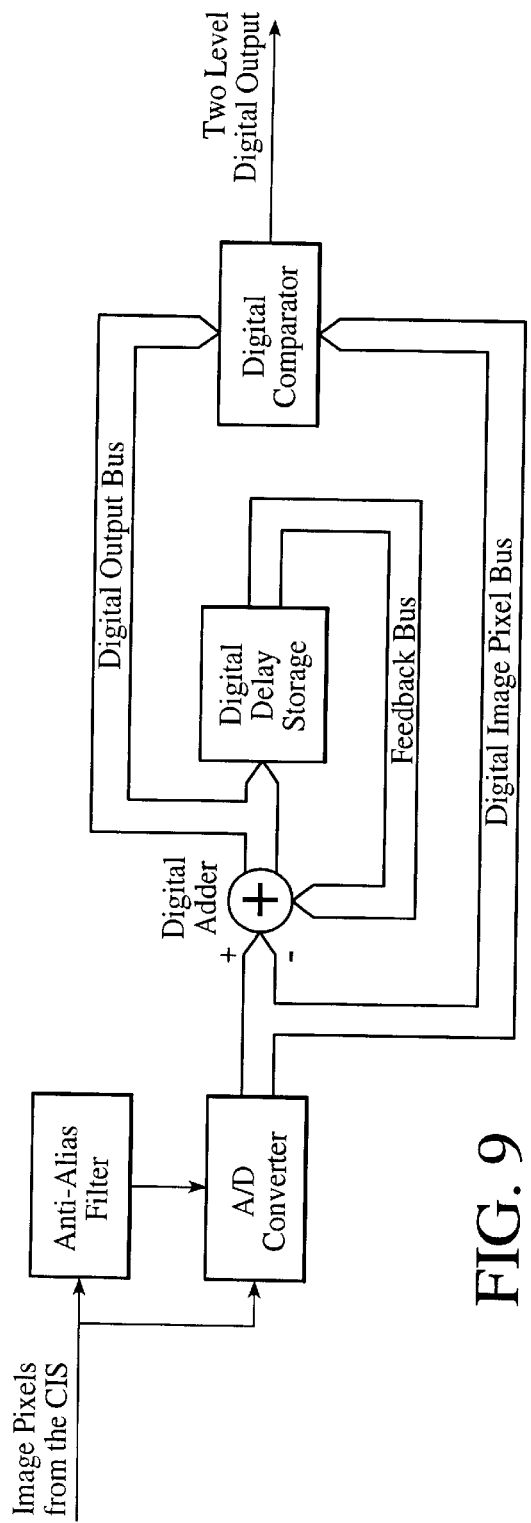
FIG. 9 is a schematic block diagram of a comparable digital implementation of the present invention.

FIG. 5 depicts a circuit schematic of the dynamic thresholding module 10 installed in conjunction with a CIS Module. The two sections of the dynamic thresholding module 10, the comparator 20 and the tracking low-pass filter 30 are shown in FIG. 6. The CIS module circuitry 5 produces analog pixel signals that are proportional to the level of light reflected from the scanned picture element on the document. This video signal is then passed to the dynamic thresholding module 10 of the present invention.

The dynamic thresholding module 10 comprises two main functional circuits—the tracking low-pass filter 30 and the comparator 20. The tracking low-pass filter 30 comprises chiefly U3, a buffer amplifier, the Initial Threshold Bias (ITB) components, and resistor R15 and capacitor C10, which in the preferred embodiment, have values of 10 k$\Omega$ and 0.1 $\mu$f, respectively. The ITB components include R6, R9, and R15, which in the preferred embodiment, have values of 100 k$\Omega$, 310 k$\Omega$, and 10 k$\Omega$, respectively. (Note that resistor R15 is included in both the overall low-pass filter function and the ITB function.) The active component of the tracking low-pass filter 30, the buffer amplifier U3, provides a high impedance input buffer. The comparator circuit 20 comprises chiefly the active component comparator U2. The comparator circuit 20 compares the output signal from the tracking low-pass filter 30 to the analog pixel signal output from the CIS circuit 5.

The dynamic thresholding module 10 receives the analog pixel signal from the CIS circuit 5 at the node labelled TV (in FIG. 5). That signal is the video signal output from the CIS module 5. The video signal is split into two branches at node TV. A first branch of the video signal is processed through the tracking low-pass filter 30 to generate a reference voltage signal that represents an averaged background level of the video signal. The background level discrimination depends on two functions of the tracking low-pass filter circuit 30—(1) the response of the low-pass filter portion of the circuit, and (2) the ITB bias voltage setting.

(1) TIME CONSTANT. Since the reference voltage signal is generated through a low-pass filter, the dominant pole of the low-pass filter will determine the time constant for averaging the input video signal. The dominant pole of the low-pass filter will therefore also determine the tracking rate of the background signal. Since the time constant is primarily determined by the values of C10 and R15, it follows that the image resolution is also set by these components. In other words, the optical spatial frequency rate of the image components is filtered to select the desired image frequencies as the background components.

(2) ITB VOLTAGE SETTING. The reference voltage signal is an output of the tracking low-pass filter 30, which essentially performs an integration function and averages the image pixel signals. However, as an integrator, the tracking low-pass filter 30 cannot determine the decision level the comparator should use to discriminate between the high or low levels of the video signal. The ITB circuit sets this bias level by providing an offset between the decision level and the averaged level. The ITB offset voltage is adjusted by the values of the network of resistors comprising R6, R9, and R15. As illustrated in FIGS. 5 and 6, the ITB voltage is set by the ratios of these component values and the supply voltage that is applied to their terminals. Because the ITB voltage levels are summed at the junction of R6, R9, R15, and C10 with the incoming background signal, the averaged background levels are increased or decreased by the ITB values. In turn, the ITB increases or decreases the reference voltage signal by a fixed amount.

It should be noted that in adjusting the components, C10, R15, R9, and R6, there will be some interaction due to the philosophy of the present invention to minimize the number of components used in the device. This philosophical design criterion will not allow the isolation of the two functions described above without undue added circuit costs. It would be relatively costly to completely isolate the dominant pole timing of the tracking filter from the ITB components. To minimize the interaction between these components, the values of R6 and R9 are chosen to be far greater than the value of R15. Under these conditions, the time constant and the ITB setting can be adjusted with minimal interaction.

In the tracking low-pass filter 30, the video signal is averaged and summed with the voltage level of the ITB circuit at the junction of C10, R15, R9, and R6. The output voltage from the tracking low-pass filter 30 is buffered by buffer amplifier U3 to isolate it from the input video signal, and is then supplied as an output at node TR.

The reference signal output from the tracking low-pass filter 30 at node TR is applied to the negative input pin of the comparator U2. This signal is compared to the unmodified video signal from the CIS module 5, which is transmitted through resistor R13 and applied to the positive input pin of the comparator U2. The comparator circuit 20 then produces an output signal depending on whether the intensity of the input video signal is greater than or less than the intensity of the signal from the tracking low-pass filter 30 (the reference signal).

The digital output of the dynamic thresholding module 10 is produced in two levels which are determined by the difference between the background reference signal and the input image signals. If the input video signal is from a lighter area of the scanned image, the digital output will be of value one, while if the input video signal is from a darker area of the scanned image, the digital output will be of value zero.

Figure 1:
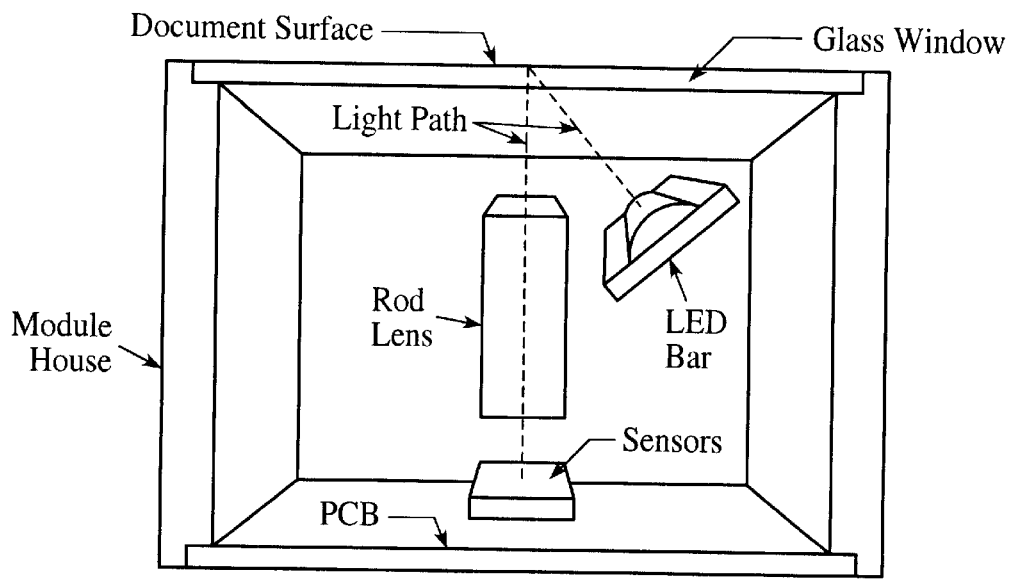
FIG. 1 is a schematic representation of a prior art scanning device.
Figure 2:
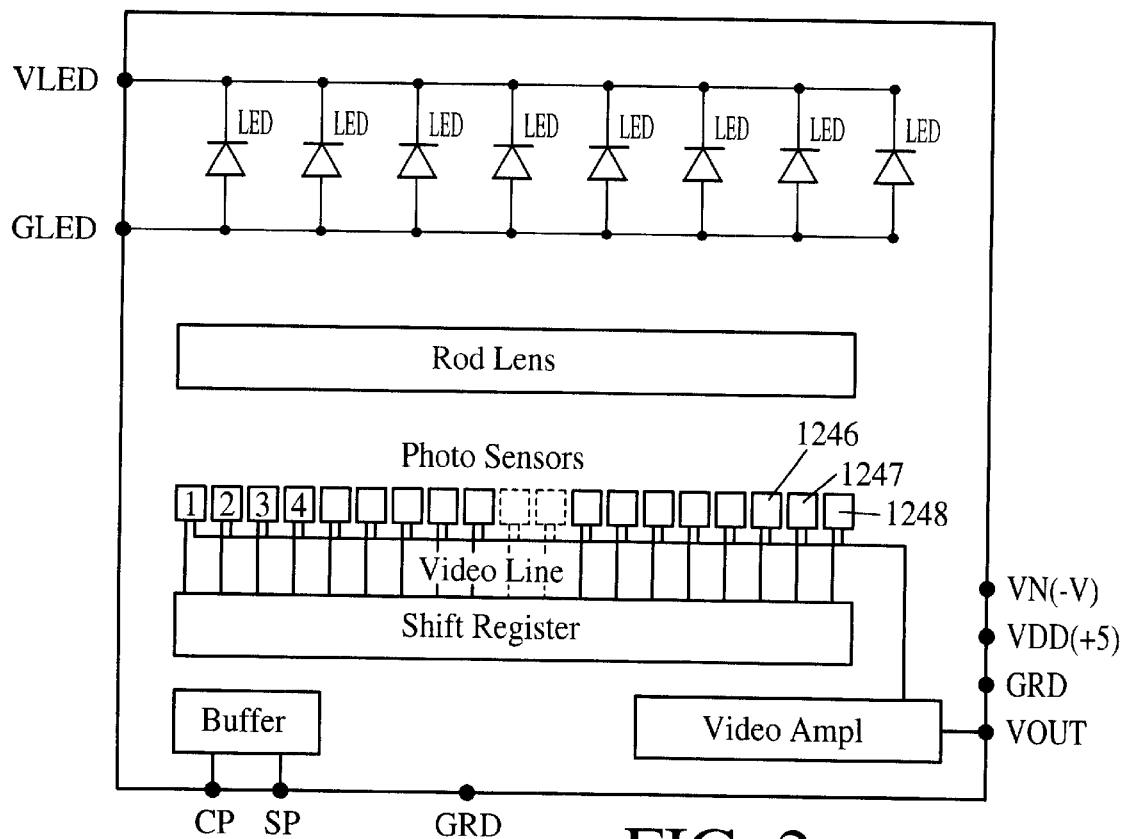
FIG. 2 is a schematic circuit diagram of the operating circuitry of the scanning device illustrated in FIG. 1.
Figure 3:
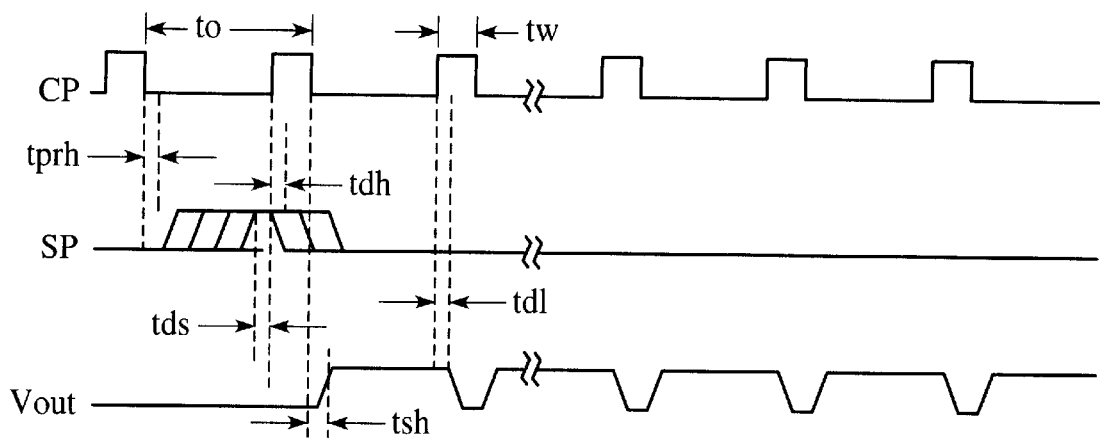
FIG. 3 is the timing diagram of the device illustrated in FIGS. 1 and 2.
Figure 4:
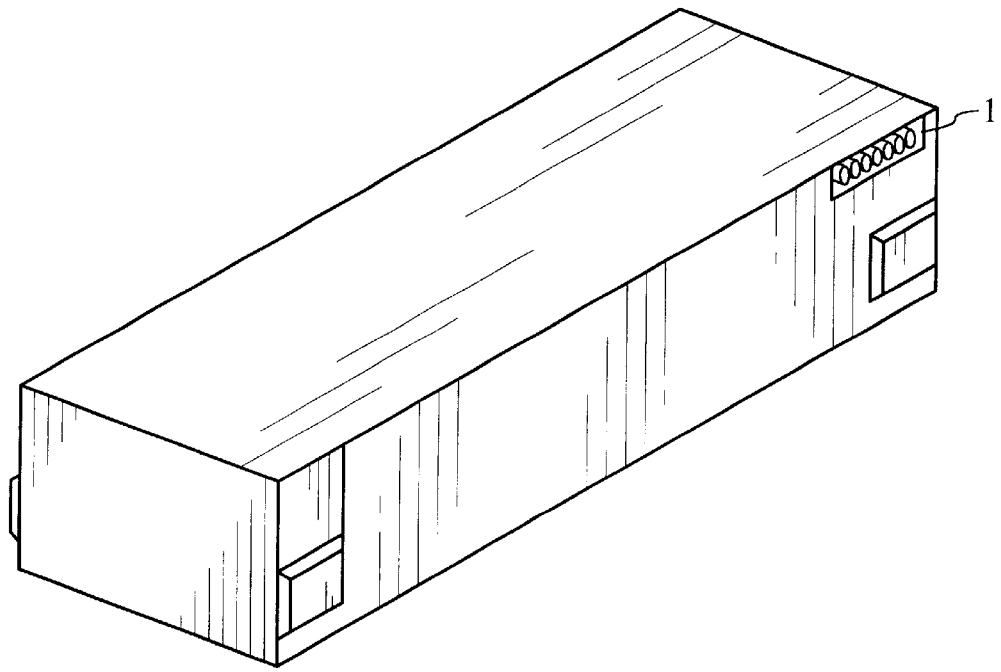
FIG. 4 is a perspective view of a module containing the circuitry of the present invention.

Utilization of the extremely efficient circuitry of the present invention enables a user to produce a very compact CIS module 10 such as that illustrated in FIG. 4. This module measures only 25.6 mm×110 mm×13 mm.

One of the most important applications of the dynamic thresholding module 10 in combination with a CIS of the present invention is as a scanning device in businesses that accept personal checks. During development of this product application, the inventors discovered that the biggest obstacle was in distinguishing the relevant printed matter from the color or design backgrounds. Since all the checks have the relevant information printed in black or dark gray ink, it is desirable to simply eliminate all other colors from the scanned information, and process only the black and dark gray images.

Figure 10:
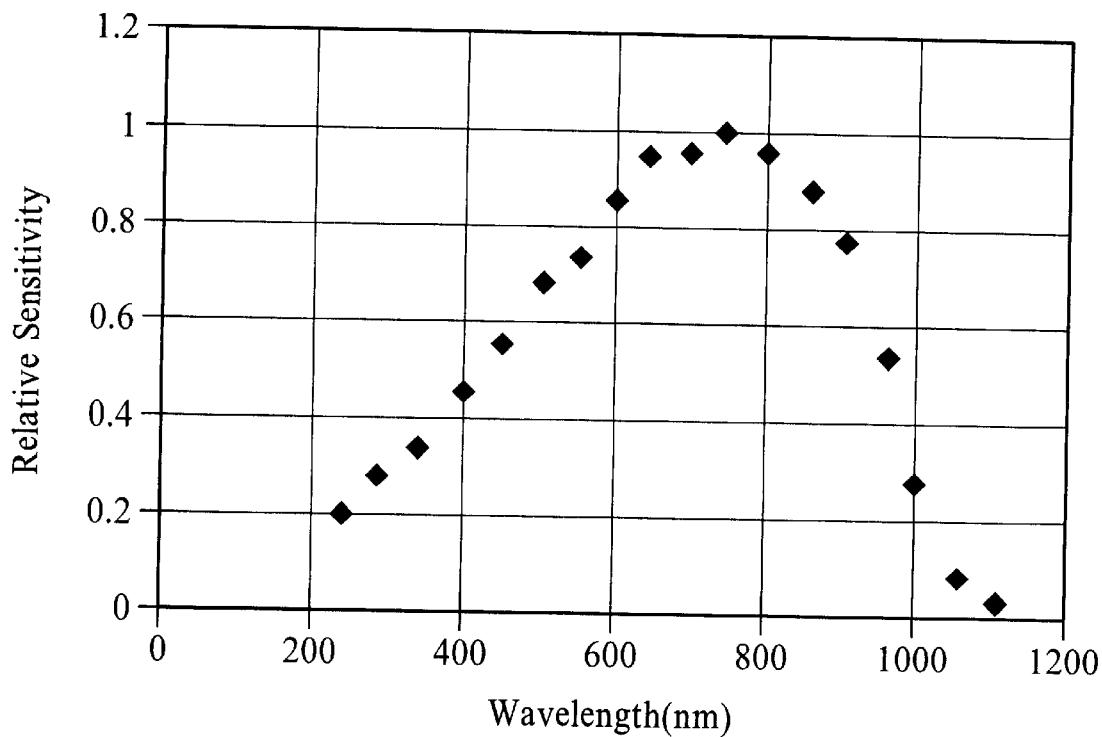
FIG. 10 is a graph of the silicon sensor response versus light wavelength.
Figure 11:
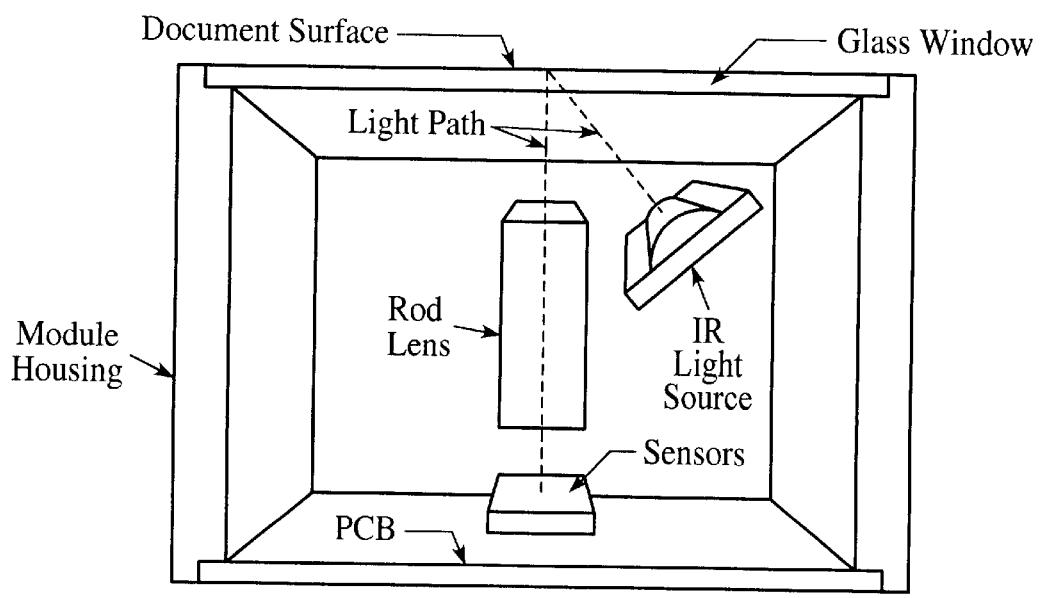
FIG. 11 is a schematic representation of the CIS system with IR light source of the present invention.

One characteristic of an IR light source is that its absorption by black and dark gray ink is very high, while its reflection from color ink, including RGB and any other colors, is also very high. The IR light is absorbed almost completely by black ink and more than 80% of IR light is absorbed by dark gray ink. However, the color ink, including RGB and other colors, reflects a significant amount of IR light. Furthermore, the silicon-based sensors are very responsive to IR light. The graph attached hereto as FIG. 10 illustrates the sensor response versus light wavelength. As a consequence, the IR light source is an excellent light source for rejecting the color background of a document, such as is commonly found on bank checks, while retaining the necessary account information printed in black and dark gray ink. Accordingly, the CIS of the present invention is equipped with an LED bar that emits infrared light as shown in FIG. 11. The LED bar emits light with a wavelength of 880±70 nm.

The use of IR light also allows the device to operate with a lower power consumption. The reflectivity of the IR light is several times higher than that of the standard yellow-green LED used in prior art CIS devices, particularly when reflected from colored surfaces.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A dynamic thresholding module in combination with a contact image sensing module comprising:

a comparator and a tracking low-pass filter comprising an analog circuit, said analog circuit processes an analog input video signal from said contact image sensing module and produces a two-level digital output, said dynamic thresholding module digitizes said input video signal by establishing a variable average background level for said input video signal, comparing said input video signal to said average background level in said comparator, and then generating an output signal that is of value one when said input video signal is from a light area of a scanned image, and said output signal is of value zero when said input video signal is from a dark area of a scanned image; and wherein said CIS contact image sensing module comprises a light source that emits light in the infrared range.

2. The dynamic thresholding module in combination with a contact image sensing module as defined in claim 1 wherein:

said light source emits light with a wavelength in the range of 880±70 nm.

3. A dynamic thresholding module in combination with a contact image sensing module comprising:

a tracking low-pass filter comprising a buffer amplifier and an initial threshold bias circuit and a comparator circuit, said comparator circuit and said tracking low-pass filter comprise an analog circuit; wherein an input video signal from said contact image sensing module is averaged and summed in said tracking low-pass filter with a voltage level of an initial threshold bias circuit to generate a reference background signal, said reference background signal is buffered by a buffer amplifier so that said reference background signal is isolated from said input video signal, said reference background signal is then applied to a first input pin of said comparator, and said input video signal is applied directly to a second input pin of said comparator, said comparator thereby generating an output signal that is of value one when said input video signal is from a light area of a scanned image, and said output signal is of value zero when said input video signal is from a dark area of a scanned image; and wherein said CIS contact image sensing module comprises a light source that emits light in the infrared range.

4. The dynamic thresholding module in combination with a contact image sensing module as defined in claim 3 wherein:

said light source emits light with a wavelength in the range of 880±70 nm.

5. A dynamic thresholding module in combination with an image sensing module using a CCD array, a photodiode array, or an active pixel array comprising:

a comparator and a tracking low-pass filter comprising an analog circuit, said analog circuit processes an analog input video signal from said image sensing module and produces a two-level digital output, said dynamic thresholding module digitizes said input video signal by establishing a variable average background level for said input video signal, comparing said input video signal to said average background level in said comparator, and then generating an output signal that is of value one when said input video signal is from a light area of a scanned image, and said output signal is of value zero when said input video signal is from a dark area of a scanned image; and wherein said image sensing module comprises a light source that emits light in the infrared range.

6. The dynamic thresholding module in combination with an image sensing module as defined in claim 5 wherein:

said light source emits light with a wavelength in the range of 880±70 nm.

7. A dynamic thresholding module in combination with an image sensing module using a CCD array, a photodiode array, or an active pixel array comprising:

a tracking low-pass filter comprising a buffer amplifier and an initial threshold bias circuit and a comparator circuit, said comparator circuit and said tracking low-pass filter comprise a n analog circuit; wherein an input video signal from said image sensing module is averaged and summed in said tracking low-pass filter with a voltage level of an initial threshold bias circuit to generate a reference background signal, said reference background signal is buffered by a buffer amplifier so that said reference background signal is isolated from said input video signal, said reference background signal is then applied to a first input pin of said comparator, and said input video signal is applied directly to a second input pin of said comparator, said comparator thereby generating an output signal that is of value one when said input video signal is from a light area of a scanned image, and said output signal is of value zero when said input video signal is from a dark area of a scanned image; and wherein said image sensing module comprises a light source that emits light in the infrared range.

8. The dynamic thresholding module in combination with an image sensing module as defined in claim 7 wherein:

said light source emits light with a wavelength in the range of 880±70 nm.

9. A contact image sensing module for rejecting a color background of a scanned document comprising:

a light source that emits light in the infrared range.

10. The contact image sensing module as defined in claim 9 wherein:

said light source emits light with a wavelength in the range of 880±70 nm.

11. An image sensing module using a CCD array, a photodiode array, or an active pixel array for rejecting a color background of a scanned document comprising:

a light source that emits light in the infrared range.

12. The image sensing module as defined in claim 11 wherein:

said light source emits light with a wavelength in the range of 880±70 nm.

* * * * *